Reissued June 11, 1929. Re. 17,323

UNITED STATES PATENT OFFICE.

RICHARD D. DAVIES, OF HUNTINGTON PARK, CALIFORNIA, ASSIGNOR, BY MESNE ASSIGNMENTS, TO P. L. & M. COMPANY, A CORPORATION OF CALIFORNIA.

PROCESS OF FACING THE CUTTING EDGES OF DRILLING TOOLS.

No Drawing. Original No. 1,613,942, dated January 11, 1927, Serial No. 111,384, filed May 24, 1926. Application for reissue filed October 1, 1928. Serial No. 309,678.

This invention relates to a process of facing the cutting edges of drilling tools, and refers particularly to a process of applying a hard cutting edge or face to drilling tools employed in the drilling of oil wells, particularly for facing core drills, fish tail bits, disk bits, and the like.

In the drilling of oil wells, the drilling bit frequently is required to penetrate a formation, part of which is composed of granite or quartz, the hardness of which may be approximately 8, as determined by the scratch method. The steel composing the body of the bit employed in drilling wells has a hardness of only about 4 or 5 and accordingly is much softer than the formation to be penetrated with the result that the bits are subjected to a very rapid rate of wear. It has therefore been the practice to face bits employed in the drilling of oil wells with metals of increased hardness in order to preserve the life of the cutting edges of said bits. In practice, however, the art has heretofore not been successful in facing these drilling bits with a material of a hardness in excess of that of the granite or quartz which must be penetrated by the bits. These facings of hard material are ordinarily applied to the bits by a process of arc welding the material on. The material has also been placed on with an acetylene torch. As far as I am aware, prior to my invention, these methods have never produced a cutting face with a hardness substantially above 7, even though the material welded to the cutting bits may itself have possessed a hardness as great as 9.

It is an object of this invention to devise a simple method of directly applying and simultaneously alloying material to a metal body to form a hard facing.

It is a further object of the present invention to provide a method and means of facing the cutting parts of drilling bits with a facing of a hardness in excess of that of quartz or granite to the end that the life of the cutting edge of these bits may be substantially increased; also, the rate of drilling of the bits may be substantially increased, and further, the time and expense consumed in rebuilding and resharpening the bits may be substantially reduced.

I have discovered in attempting to face the cutting edge of a bit with a material of a hardness of over 8, that whether such material is welded on with an acetylene torch or a carbon arc electro, there is an oxidation which accompanies the welding process and substantially reduces the hardness of the finished facing. This oxidation may be eliminated and the hardness of the original material more nearly preserved through providing a substance, particularly carbon, at the weld during the welding operation. Accordingly, under the process of the present invention, I supply carbon preferably in the form of coke, simultaneously with the supply of the hard facing material to the weld, in a quantity sufficient to prevent oxidation and to such an extent as to produce a final hardness of the metal in excess of 8.

In my process I employ metals which do not rapidly oxidize under a process of arc welding. Thus, for example, it has been found practical to employ as the facing material, a metal containing over 75 per cent of tungsten, preferably approximately 85 to 86 per cent of tungsten.

In connection with the use of the deoxidizing material, particularly coke, the metal containing 86 per cent of tungsten may be welded upon a cutting bit by electric welding apparatus employing carbon electrodes, and produces a facing of a hardness as high as 9 or 9.1.

Thus, in the preferred process of forming a hard facing upon a metal body, as for example in facing bits, I employ a rod of metal containing over 75 per cent of tungsten and preferably about 85 or 86 per cent of tungsten, with approximately 3 to 6 per cent of carbon, and advance such rod in the welding arc as required and accompanying the welding operation by continuous supply of powdered coke to the welding surface.

An alternate method of welding embodying the present invention is by the employment of a rod containing itself sufficient powdered coke to prevent oxidation or to permit the formation of an alloy facing of the desired hardness. For this purpose, I employ a rod of tungsten of a composition so that there is present from 75 per cent and preferably 85 per cent of tungsten, 3 to 6 per cent of carbon, and around this rod, there is placed approximately 10 per cent by weight, of powdered coke, the powdered coke being admixed with a binder such, for instance, as sugar syrup, the rod then being baked prior to its use in the welding process.

The particular feature of the present invention resides in the use of high tungsten welding rods in connection with a supply of a reducing agent, such as coke, in sufficient quantities to prevent oxidation. Either of the above two features separately have not so far been shown to be able to produce a face of the hardness above 8. The use of metal welding rods containing 86 per cent of tungsten of a hardness of 9.6 to 9.7 in a welding process results in the facing of a hardness of approximately 7 where the coke or reducing material is omitted. Also the use of the coke in connection with welding rods containing tungsten of less than 75 per cent is shown also to result in the production of a facing of a hardness of less than 8.

The drilling bits faced in such manner have been found to be adapted to penetrate formations with a rate of wear very markedly lower than that of the drilling bits heretofore employed for the same purpose. For example, with the present forms of core drills, it is found most universally necessary to rebuild the cutting faces with an electric torch, and reface the same after each core taking operation. A core drill face in accordance with the pesent invention is found adapted to repeatedly take cores without requiring a rebuilding and reconstruction of the bit after each operation.

This invention is of the full scope set forth in the appended claims.

I claim:

1. The process of facing bits for drilling wells which comprises welding to the cutting faces of the bits a hard metal containing over 75 per cent of tungsten while co-jointly supplying sufficient carbon to produce a resultant facing having a hardness in excess of 8.

2. A process of facing well drilling bits which comprises applying with an arc weld a facing metal containing over 75 per cent of tungsten while co-jointly supplying coke to the arc so as to produce a hard facing on the bit having a hardness in excess of 8.

3. A process of facing bits which comprises arc welding a hard metal to the cutting face of the bits, the metal containing over 75 per cent of tungsten, while supplying powdered coke at a rate sufficient to produce a cutting face having a hardness in excess of 8.

4. A welding rod containing a bar of tungsten metal in which there is at least 75 per cent pure tungsten, the rod having baked thereto powdered coke.

5. The process of forming a hard metal facing upon a metal body comprising heating material of which tungsten is the principal element on the surface of the body to effect fusion of the tungsten and bonding to the body, the material also containing a quantity of carbon, a portion of the carbon being burned away during the step of fusion while the remainder hardens the tungsten.

6. The process of forming a hard metal facing upon a metal body comprising heating material of which tungsten is the principal element on the surface of the body by electrical welding to effect fusion of the tungsten and bonding to the body, the material also containing a quantity of carbon, a portion of the carbon being burned away during the step of fusion while the remainder hardens the tungsten, the resulting facing having a hardness in excess of 8.

7. The process of forming a hard metal facing upon a steel body comprising heating material containing over 75% tungsten on the surface of the body to effect fusion of the tungsten and bonding to the body, the material also containing a quantity of carbon being burned away during the step of fusion while the remainder hardens the tungsten, the resultant facing having a hardness in excess of 8.

8. The process of forming a hard metal facing upon a steel body comprising heating material containing over 75% tungsten on the surface of the body to effect fusion of the tungsten and bonding to the body, the material also containing more than 3% of carbon, a portion of the carbon being burned away during the step of fusion while the remainder hardens the tungsten, the resulting facing having a hardness in excess of 8.

9. A process of forming a hard metal facing upon a steel body comprising heating material of which tungsten is the principal element on the surface of the body to effect fusion of the tungsten and bonding to the body, the material also containing in excess of 3% of carbon.

10. The process of forming a hard metal facing upon a metal body comprising heating material of which tungsten is the principal element on the surface of the body to effect fusion of the tungsten and bonding to the body, the material also containing carbon which hardens the tungsten, the fusion being effected under non-oxidizing conditions to prevent oxidation of the tungsten, the resulting facing having a hardness in excess of 8.

11. The process of forming a hard metal facing upon a metal body comprising heating material of which tungsten is the principal element on the surface of the body to effect fusion of the tungsten and bonding to the body, the material also containing more than 3% of carbon which hardens the tungsten, the fusion being effected under non-oxidizing conditions, the resulting facing having a hardness in excess of 8.

RICHARD D. DAVIES.